May 21, 1968 W. J. GRUEN 3,384,712
DISPLAY DEVICE AND METHOD OF MANUFACTURING SAME
Filed Sept. 22, 1964

INVENTOR
WOLF J. GRUEN
BY
AGENT

United States Patent Office 3,384,712
Patented May 21, 1968

---

3,384,712
DISPLAY DEVICE AND METHOD
OF MANUFACTURING SAME
Wolf J. Gruen, Tarzana, Calif., assignor to The Bunker-Ramo Corporation, Canoga Park, Calif., a corporation of Delaware
Filed Sept. 22, 1964, Ser. No. 398,180
8 Claims. (Cl. 178—7.87)

ABSTRACT OF THE DISCLOSURE

A cathode ray tube with a screen upon which a composite image of video and optical information appears, an optical projection port and an optical projector system to project the optical information through the port, said projector and port being aligned with the axis perpendicular to a plane tangent to the screen center and the electron gun being angularly displaced from this axis. The screen inner surface is roughened to a controlled degree and the system includes means to simultaneously adjust the magnitude of the scanned image and the optically projected image.

---

The present invention relates to improvements in information display apparatus and to improved methods for manufacturing such apparatus.

More particularly, the present invention relates to an improved system by means of which it is possible to display on a single target area a visible composite image which is formed in part by a modulated electron beam adapted to scan said target area and also in part by an optical projection system.

It is frequently desirable to provide a visual presentation made up of a combination of a relatively changing video information display and a relatively fixed optical image display. Such is desirable, for example, when there is a given format made up of intersecting lines in which format changing alphanumerical data are to be displayed. The alphanumerical data may then be provided in the form of video information generated by output devices of a computer or other data handling device whereas the lined format may be displayed in the form of an optical image projected from a suitable object slide. Another situation wherein such a combined display may be useful is in showing data referring to stocks of raw material or manufactured items in storage facilities. In this situation a representation of the storage facilities themselves may be shown in the form of a block diagram whereas data concerning the variable contents of the storage facilities may be provided by a data handling system that provides output in the form of video information which is in turn shown in appropriate blocks of the diagram so that an observer of the display may be quickly informed about current inventories.

It will be readily understood that there are many other situations wherein a combined display of video information and information from an object slide can be useful. In general, the information on the object slide will be of a more permanent nature whereas the information that is to be displayed by means of a video channel will normally be of a more temporary and changeable nature.

It has been known for some time to project an image of an object slide upon the screen of a cathode ray tube whereby said screen at the same time may show an image generated by an electron beam directed to the screen. A very serious shortcoming that so far existed in such systems is commonly referred to as the "hot spot" effect. In a normal cathode ray tube, without an optically formed image such as is utilized in a television set, this so-called "hot spot" effect is barely noticeable because the luminosity of the cathode in the cathode ray tube is very low. However, when it is attempted to project an optical image on the target screen, a serious shortcoming of the display which then results is that an observer standing in front of the screen notices a highly brilliant spot at the location of the exit pupil of the optical system. The image at the location on the screen in a line between the exit pupil of the optical system and an observer may be so brilliant that the image generated by the scanning electron beam is not perceptible. In order to see all of the information displayed on the screen by the electron beam, the observer has then to change his position so that the "hot spot" shifts its apparent position on the screen surface.

In order to alleviate the troublesome hot spot effect, it has been proposed to arrange the optical system so that its axis is angularly displaced at an angle with respect to a line which is perpendicular to a plane tangential to the central region of the screen. Though this remedies the situation somewhat, this also has certain disadvantages because it brings along complications in the construction of the optics. If the optics are arranged off-axis, the designer runs into a complicated situation because of the fact that a target surface of a cathode ray tube generally is spherical so that it is necessary to design the optics in such fashion that an image is formed having a field curvature that is identical or at least approximately identical to the spherical shape. This is not only desirable for good image definition but also serves the purpose of avoiding distortion so that a coincidence may be obtained of the corresponding points in the electron image and the optical image. Though it is possible at considerable expense to design an optical system that is adapted to this complex situation (field curved and at an inclination to the optical axis) when only one scale of magnitfiication is required, it is next to impossible to design such an optical system, when, on top of these complications, it is also desirable to provide means or controllably changing the magnification. Such a system might require lens systems incorporating elements that are not only nonspherical but also lens elements that are not even bodies of revolution.

Therefore, where it is desired to project an optical image on the cathode ray screen, and when the optical elements are to be interchangeable or adjustable, the optical system should be oriented along a line perpendicular to a plane tangential to the central area of the target screen. However, this orientation is at the same time the most unfavorable with respect to the "hot spot" effect in that the "hot spot" is thus caused to appear at the very center of the screen as normally viewed.

It is the main object of the present invention to improve display devices of the type in which a first image is projected on a target surface through an optical system whereas a second image is superimposed thereon which second image is generated by a modulated electron beam that scans said same target surface.

Another object of the invention is to substantially eliminate the "hot spot" effect in display devices where an optical image and an electronically generated image are projected on the same target surface.

Still another object of the invention is to provide a display device that enables an image to be formed on a target screen at various scales without undue complexity of the optical system whereby the target screen is also adapted to display an image that is generated electronically.

Briefly, these and other objects of the invention, according to one important aspect thereof, are achieved by providing a cathode ray tube in which, firstly, the axis of the electron gun is angularly displaced with respect to a reference which is in a line perpendicular to a plane tangent at the center point of the phosphorescent screen on target and, secondly, an optical projection port is provided so as to allow an optical image to be projected along an axis coincident with said reference line. Further, in accordance with the present invention, a light scattering means other than the usual phosphor is provided at or in close proximity to the target screen. This aspect of the invention is based on the recognition that though the normal phosphor layers which are extremely thin are suited to provide an excellent image from information supplied in the form of a scanning electron beam, the light scattering properties of the normal layers of phosphor are not suited to provide a good image of an optically projected object slide. By providing, in addition to the phosphor, a nonluminescent material that scatters the light, a situation can be created wherein the electronic image still has excellent qualities but it is virtually impossible to see the exit pupil of the optical system through the target screen.

The invention will be better understood, and its various advantages and objects more fully appreciated, by the following description given in conjunction with the drawing wherein:

FIG. 2 shows a cross-section through a portion of the target screen in an enlarged scale of one embodiment; whereas

Figure 1:
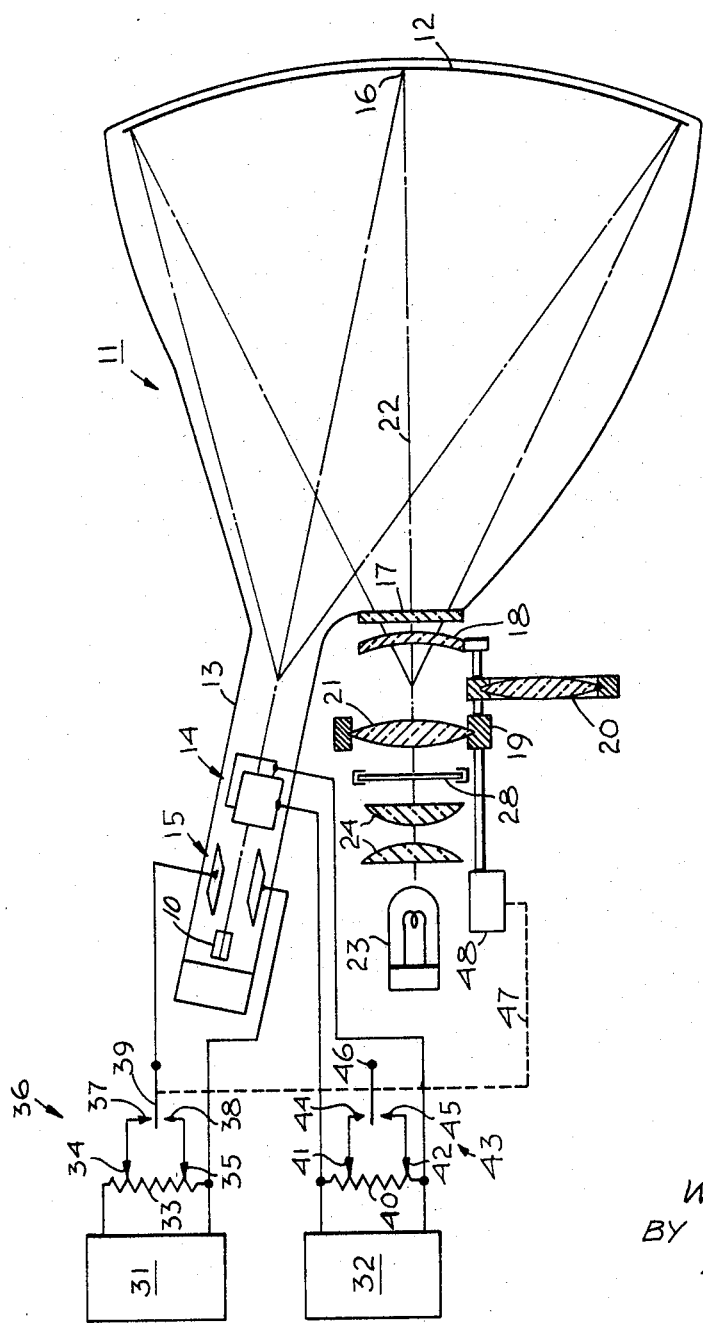
FIGURE 1 shows a longitudinal section partly in schematic form of a display device according to the invention.

Referring now to FIG. 1, there is shown a cathode ray tube envelope 11 having a frontal portion 12. Preferably the tube is made entirely of glass. Within the neck portion 13 are housed an electron gun 10, a pair of horizontal deflection plates 14 and a pair of vertical deflection plates 15. The neck portion 13 is directed to the center 16 of the frontal portion of the tube 13 and disposed at an angle to a line or axis 22 perpendicular to the center of said frontal portion so as to display on the target disposed at the inside of the frontal portion 12, the information supplied by the video signal source not separately shown. Various other elements that may be located in and around the neck portion 13 are not shown because they are irrelevant with respect to the subject matter of the present invention and they are common either to all cathode ray tubes or to cathode ray tubes having a neck portion disposed at an angle with respect to a line perpendicular to the frontal portion of the tube; for instance, means necessary to avoid pincushion distortion as may be utilized in such situations. The techniques therefor are well known from the literature; see, for instance, D. E. C. Fink, "Television Engineering Handbook," McGraw-Hill, 1957.

At a portion of the envelope opposite the center 16 of the frontal portion 12 there is provided an optical port which may take the form of a plane parallel plate 17 of glass which is suitably sealed such as by a conventional glass frit seal to the remaining portion of the envelope. The glass plate 17 serves as a window for admitting an image forming light beam to the interior of the envelope. Preferably, the plane parallel plate is oriented parallel to a plane tangent to the central area of the frontal portion 12 of the envelope 11. In close proximity to the parallel plate 17 there is mounted a field lens 18. A turret 19 allows either one of the lenses 20 and 21 to be centered along the optical axis 22 which passes through the center of both the parallel window plate 17 and the center 16 of the frontal portion 12 of the envelope. An object slide 28 may be illuminated by a light source 23 in combination with a suitable condenser 24 which may be composed of a combination of lenses as is well known in th art. There may be provided a slide change mechanism (not shown) so that it is possible to select a single one of a plurality of slides that may be required under various circumstances. Furthermore, there will normally be provided means for changing the location of the slide so that various areas of the slide may be selectively projected upon the frontal portion of the envelope in situations where it is desired to inspect a certain area of the slide in enlarged form upon the screen.

In conjunction with the changing of the magnification of the optical image, there is provided means for changing the size of the image formed by the modulated electron beam that scans the target area. There is provided a vertical deflection voltage generating means 31 and a horizontal deflection voltage generating means 32. Across the output of the vertical deflection voltage generating means there is provided a potentiometer 33 having adjustable taps 34 and 35 connected respectively to contacts 37 and 38 of a contact assembly 36 including also a movable contact 39. Similarly, the horizontal deflection voltage generating means 32 has connected across its output terminals a potentiometer 40 having adjustable taps 41 and 42 connected respectively to contacts 44 and 45 of a contact assembly 43 that is also provided with a movable contact 46. It will be obvious that instead of electrostatic deflection means, as shown, electromagnetic deflection means my be utilized. A dotted line 47 represents a mechanical or electromechanical connection to an operating device 48 that allows the selection of either one or the other of the two positions of the interchangeable optics. In operation, the adjustable taps 34 and 41 may first be so adjusted that the horizontal and vertical dimensions of the image generated by the scanning electron beam registers with the image formed by the optical system when one of the lens combinations is in operation. For this purpose, the video information may be of such character as to provide suitable marks that should coincide with corresponding markings on the optical slide so that the adjustment of the voltages provided for the horizontal and vertical deflection plates can be conveniently performed. Thereafter the taps 35 and 42 are adjusted whereby the exchange mechanism for the optics is operated so as to put the other lens combination into effect and the markings provided on the slide and stored in the video information are again brought to exact registration. The mechanical coupling between the contacts 39 and 46 on one hand and the optics exchange device 48 on the other hand will thereafter enable an operator of the display device to quickly change from one magnification to the other without carrying out adjustments in the scale of the electronic image each time the scale of optical image is changed.

The exchange mechanism for displaying the optical image selectively on one scale or the other is mainly possible, because the optics can be axially oriented, so that the optical problems are surmountable. However, this again is related to the particular manner, taught by the invention, for eliminating the "hot spot" effect. Said effect would in the absence of the teaching of the invention be especially troublesome with axially oriented optics.

In the following, several techniques are described for manufacturing the target screens of the display devices of the invention.

Figure 2:
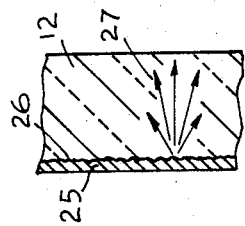

The frontal portion of the screen 12 supports, in the first place, a suitable phosphor, a material that emits light in response to a focused electron beam impinging thereupon. A layer of phosphor 25 is shown in enlarged form in FIGS. 2 and 3. The phosphor layers may have a thickness of a few microns and in the cross-section of FIGS. 2 and 3 the thickness of the phosphor layer is considerably exaggerated because it would be difficult to show the thicknesses of the glass of the envelope 11 and of the phosphor layer 25 in their natural relative proportions. Whereas the front surface of the envelope has a high polish, the inner surface which faces the window 17 shows, in cross-section, a roughened appearance such as may be brought about by sandblasting or chemical etching, as is more particularly shown in FIG. 2. If the phosphor 25 is deposited, as is conventionally done, on polished surface, the light scattering brought about by the phosphor alone is insufficient to make the target screen suitable for the exhibition of an optically projected image; that is, an observer standing in front of the screen will see the "hot spot" formed by the exit pupil of the optical system as a very bright area. If the roughened inner surface 26 of the glass envelope 12 is struck by a light ray coming from the exit pupil, there is still a certain amount of light radiated in a straight line extending from the pupil of the optical system and the particular location on the screen; however, there is a substantial amount of light scattered from the original direction in lateral directions as is shown schematically by the various arrows 27. The result is that the "hot spot" is almost completely invisible. By roughening the surface to a suitable degree, a plurality of reflecting surfaces is formed so that every point of the screen forms a luminous point that radiates light in various directions, which makes it virtually impossible to see the "hot spot" through the target surface.

In preparing the target surfaces of the invention, it is important that the degree of roughness be properly controlled. A suitable degree of surface roughness for the purposes of the invention is a so-called "photofinish." The term is derived from the utilization of similar ground glass surfaces to be placed over a photograph whereby it is sometimes desirable to prevent excessive reflection. This can be done by introducing a slight surface roughness on a sheet of glass that protects a photograph. People skilled in the art of preparing such glass plates understand such expressions as "photofinish" and "near photofinish" as degrees of surface roughness that are defined with sufficient exactitude for the purpose of teaching this invention. Another degree of roughness which is suitable for the purposes of the present invention is a so-called "fine finish" which is a somewhat rougher finish. A too large degree of surface roughness, whereby an excessive amount of crevices and holes might be formed at the inside of the frontal portion of the glass envelope, is disadvantageous because in that case no sharp electron beam image can be formed. In the layer of phosphor any particle of phosphor that is impinged upon by the electron beam emits light in all directions including the direction from where the electrons come. It should be obvious that too thick of a layer of light scattering structure and an excess of crevices or scattering particles would tend to make both the optical image and the electronic image appear to be hazy or out of focus. Furthermore, the surface roughness should not be of such a degree that it would be necessary to considerably increase the thickness of the phosphor layer over the conventional thickness which is generally less than a few hundredths of a millimeter.

The light scattering layer can be produced in several ways. A very suitable way is sandblasting, which, of course, has to be performed prior to sealing the tube to such a degree that the desired finish is obtained.

Another method of producing the desired finish is by chemical etching which preferably is done on the inside surface of the frontal portion 12 of the envelope at a time before this portion of the tube is sealed to the rest of the envelope. Though chemical etching by a suitably diluted solution of hydrofluoric acid provides a highly suitable surface, extreme care should be exercised to prevent an action of the acid on the surfaces to be sealed because it is desirable that these surfaces have a high degree of flatness (not shown) prior to their assembly by means of a glass frit (not shown) and oven heating.

After the manufacturing of the light scattering layer as hereinabove described, the phosphor is deposited upon said layer by conventional techniques. One method is to simply dust the layer of phosphor upon the inside of the tube that serves as a target. It has been found that this usually gives adequate adherence of the phosphor to the glass. Another conventional method which may be followed is spraying a liquid suspension of the phosphor on the inside of the frontal surface of the envelope, if desired, with a suitable adhesive such as an alkali silicate and subsequent drying. A third method which has been used is to place a dilute aqueous suspension of the phosphor within the tube whereafter the suspension is allowed to stand and the phosphor is gradually sedimented on the target surface. After sedimentation, a major portion of clear liquid may then be removed such as by siphoning and the phosphor allowed to dry so as to form an even thin coating that adheres to the inside.

Figure 3:
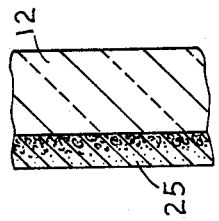
FIG. 3 shows a cross-section in an enlarged scale of a second embodiment.

The latter technique which is, in itself alone, conventional, may also be utilized in somewhat modified form to manufacture a target screen according to the invention. Instead of an aqueous suspension of phosphor alone, there is prepared a suspension containing both phosphor particles and light scattering particles of a material, such as glass, that does not have to show luminescence. A suitable particle size of the glass is between one and ten microns. This suspension is allowed to stand in such a position that sedimentation takes place on the inside of the frontal portion of the envelope whereby a mixture of luminescent and light scattering particles is deposited on the target surface. An enlarged cross-section of a target, manufactured in this way, is shown in FIG. 3 wherein particulate light scattering material 26 is shown to be embedded in the layer of phosphor 25. As in FIG. 2, the dimensions could not be shown in their true proportion.

With each of the above techniques there may be formed a target surface that has sufficient light scattering properties so as to substantially eliminate the "hot spot" effect, and still provides a suitable means for exhibiting an image formed upon the target surface by a modulated electron beam.

It should be apparent that in the foregoing there has been described a display device and a method for preparing the same. As will be obvious to those skilled in the art, various changes and modifications may be made in the device described and in the methods for manufacturing or preparing these devices without departing from the true spirit and scope of the invention which is defined in the following claims.

The embodiments of the invention in which an exclusive property or privilege is claimed are defined as follows:

1. A display device for simultaneously exhibiting on a single target surface an image formed by a scanning beam that is modulated by video information and an optically projected image comprising:
   a cathode ray tube having a light transmissive target structure, an electron gun means for directing an electron beam toward a surface of said target structure, and means responsive to said video information for deflecting said beam,
   a layer of phosphor and light scattering means other than said phosphor disposed upon that surface of said target structure toward which said beam is directed, and
   light transmissive window means integral with said cathode ray tube for passing an optical image projected thereon onto said surface.

2. A display device as defined in claim 1, said light scattering means comprising a roughening of said surface upon which said phosphor is disposed.

3. A display device as defined in claim 1 wherein said target structure is glass and said light scattering means comprises a chemically etched roughening of said surface upon which said phosphor is disposed.

4. A display device as defined in claim 1 wherein said light scattering means comprises a roughening of said surface produced by the erosive action of blasted particulate material.

5. A display device as defined in claim 1 wherein said light scattering means is a particulate material that is adhered to that surface to which said gun means is directed.

6. A device for displaying on a single target surface an image generated by a modulated electron beam that scans said surface and an image projected by an optical system comprising:
- a cathode ray tube having an envelope and a target surface, said target surface being adapted to exhibit a luminescent image upon impingement thereof by an electron beam,
- a window portion in said envelope located in opposing relation to said target surface and embracing a first line passing through the central portion of said target surface, said first line being substantially perpendicular to a plane tangent to said central portion,
- optical image projecting means disposed outside said envelope and centered along said first line and capable of projecting an object slide through said window portion upon said target surface, and
- electron beam forming and deflecting means, the axis thereof being disposed along a second line directed to said central portion of said target surface and forming an angle with said first line.

7. A device for displaying on a single target surface an image generated by a modulated electron beam that scans said surface and an image projected by an optical system comprising:
- a cathode ray tube having an envelope and a target surface, said target surface being provided with a phosphor for exhibiting a luminescent image in response to a modulated electron beam impinging thereon and light scattering means other than said phosphor for exhibiting a light image projected upon said target surface,
- a window portion in said envelope located in opposing relation to said target surface and embracing a first line passing through the central portion of said target surface, said first line being substantially perpendicular to a plane tangent to said central portion,
- optical image projecting means disposed outside said envelope and centered along said first line and capable of projecting an object slide through said window portion upon said targent surface, and
- electron beam forming and deflecting means, the axis thereof being disposed along a second line directed to said central portion of said target surface and forming an angle with said first line.

8. A device as defined in claim 6 wherein there is provided first scale selecting means for selecting a first combination of optical elements capable of projecting an object slide upon said target surface in accordance with a first scale and a second combination of optical elements capable of projecting said object slide upon said target surface in accordance with a second scale,
- second scale selecting means for generating the image produced by the electron beam selectively on said first scale and said second scale, and
- means coupling said first and second scale selecting means so as to selectively project the electron image and the optical image both on said first scale and both on said second scale.

References Cited

UNITED STATES PATENTS

| | | | |
|---|---|---|---|
| 2,169,838 | 8/1939 | Herbst | 178—7.5 |
| 2,316,550 | 4/1943 | Bigalke | 178—7.83 |
| 2,415,226 | 2/1947 | Sziklai | 178—7.87 |
| 2,680,205 | 6/1954 | Burton | 313—116 |
| 2,873,396 | 2/1959 | Baldwin | 313—111 |
| 3,054,998 | 9/1962 | Cooper | 178—6.8 |

ROBERT L. GRIFFIN, *Primary Examiner.*

JOHN W. CALDWELL, *Examiner.*

J. A. ORSINO, *Assistant Examiner.*